(12) United States Patent
Bohn et al.

(10) Patent No.: US 8,195,881 B2
(45) Date of Patent: Jun. 5, 2012

(54) SYSTEM, METHOD AND PROCESSOR FOR ACCESSING DATA AFTER A TRANSLATION LOOKASIDE BUFFER MISS

(75) Inventors: Richard E. Bohn, Shakopee, MN (US);
Ka-shan Choy, Poughkeepsie, NY (US);
Chung-Lung Kevin Shum, Wappingers Falls, NY (US); Aaron Tsai, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 12/037,267

(22) Filed: Feb. 26, 2008

(65) Prior Publication Data
US 2009/0216947 A1  Aug. 27, 2009

(51) Int. Cl.
*G06F 13/00* (2006.01)
(52) U.S. Cl. .............................. 711/122; 711/E12.014
(58) Field of Classification Search .................. None
See application file for complete search history.

(56) References Cited

U.S. PATENT DOCUMENTS

| 5,023,776 | A | | 6/1991 | Gregor |
| 5,826,052 | A | | 10/1998 | Stiles et al. |
| 5,987,585 | A | * | 11/1999 | Motoyama et al. ............... 712/1 |
| 6,138,208 | A | | 10/2000 | Dhong et al. |
| 6,427,188 | B1 | | 7/2002 | Lyon et al. |
| 2007/0250667 | A1 | * | 10/2007 | Dement et al. ................ 711/136 |
| 2008/0294867 | A1 | * | 11/2008 | Kimura .......................... 711/204 |
| 2009/0164733 | A1 | * | 6/2009 | Kim et al. ...................... 711/133 |

OTHER PUBLICATIONS z/Architecture: "Principles of Operation"; Sixth Edition, Apr. 2007, Publication No. SA22-7832-05, copyright IBM Corp. 1990-2007, Chapter 1 (pp. 1-1 through 1-22) and Chapter 3 (pp. 3-1 through 3-64).

* cited by examiner

*Primary Examiner* — Edward Dudek, Jr.
*Assistant Examiner* — Sean D Rossiter
(74) *Attorney, Agent, or Firm* — Cantor Colburn LLP; John Campbell

(57) ABSTRACT

Data is accessed in a multi-level hierarchical memory system. A request for data is received, including a virtual address for accessing the data. A translation buffer is queried to obtain an absolute address corresponding to the virtual address. Responsive to the translation buffer not containing an absolute address corresponding to the virtual address, the absolute address is obtained from a translation unit. A directory lookup is performed with the absolute address to determine whether a matching absolute address exists in the directory. A fetch request for the requested data is sent to a next level in the multi-level hierarchical memory system. Processing of the fetch request by the next level occurs in parallel with the directory lookup. The requested data is received in the primary cache to make the requested data available to be written to the primary cache.

20 Claims, 2 Drawing Sheets

SYSTEM, METHOD AND PROCESSOR FOR ACCESSING DATA AFTER A TRANSLATION LOOKASIDE BUFFER MISS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

The present disclosure relates generally to accessing data, and more particularly, to obtaining data, and a storage key when appropriate, alter storage address translation in a system with pipelined processors.

2. Description of Background

Multiprocessor systems comprise a plurality of processors, each of which may at some point need access to main memory. This need for memory accesses may arise simultaneously with respect to two or more of the processors in the multi processing system. Such systems may comprise intermediate level caches for temporarily storing instructions and data. A cache memory, or cache, is a high-speed memory positioned between a processor and main storage to hold recently accessed main storage data. When data in storage is requested in a processor system, a determination is first made whether or not the data is in the cache. If the data is in the cache, it is accessed from the cache. If the data is not in the cache, then the data is obtained from the main storage. The data obtained from the main storage is then stored in the cache, usually replacing other data that had been previously stored in the cache.

A cache hierarchy may exist, in which multiple levels of caches exist between the processor and main storage. For example, a multiprocessing system may include a first level or primary cache storage (L1) that is closest to the processor and one or more intermediate levels of memory or caches that are closer to the main memory, e.g., intermediate caches (L2, L3, . . . LN). The L1 cache may be considered the bottom-most cache, and LN cache may be considered the highest-level cache. As the cache levels get farther away from the processor, each cache gets larger, slower, and cheaper.

In a virtual memory system, a memory access request usually includes a virtual address (VA) (also referred to as a logical address or effective address) known to the associated program. The real address (RA) (also referred to as an absolute address or physical address) in main memory associated with a VA can be determined through a translation process. The translation process is a multi-cycle, multi-step process that involves table lookups to get the RA.

To speed up the translation, a translation look-aside buffer (TLB) (also known as dlat or erat) is used. A TLB holds the VA and corresponding RA for recent translations. The TLB is similar to a data cache. It is a cache for storing translations.

A cache has a corresponding directory array, which holds the addresses of the data currently in the cache. Each address corresponds to a unit of storage called a line. The address that is stored within a directory array entry is called a tag.

When a request for data is sent from the core (processor core) to the L1 cache, the request address is compared against the addresses in the directory to see if the corresponding requested data is in the L1 cache. The range of address bits that is used to address the directory is called a directory index or congruence class. In order to access the data from a L1 cache with a directory that is absolute address managed based on the virtual address obtained through a program instruction, the corresponding absolute address is needed.

Although the L1 cache can be designed as virtual address based, higher level caches in the hierarchy, e.g., L2, L3, etc., and most importantly, main memory are absolute address based. Therefore, if a cache miss occurs, the absolute address is required to obtain desired data.

There are many possible virtual to real address translations, and all the translations cannot be held in the TLB. If the RA corresponding to the VA included in a data request is not stored in the TLB, a TLB "miss" occurs. If a TLB miss occurs, the translation from VA to RA may be obtained from a Translator Unit (XU).

After getting a Dynamic Address Translation (DAT) result from the XU in the event of a TLB miss, the obtained absolute address can be used to fetch the cache line from the L2 cache if the line is not in the primary (L1) cache. Often times, the address that missed in the TLB also misses the L1 cache. It is not desirable to wait through the pipeline delays needed to perform a primary cache directory lookup using the absolute address received after a TLB miss before sending a request to the L2 cache to obtain the desired data, since most likely the line is not available in the L1 cache.

Depending on architectural requirements, the TLB may need more fields than just the VA and corresponding RA to provide the requested translation. A storage key is one of these fields. As those skilled in the art would appreciate, the storage key is used by software or operating systems for storage access protection. It is usually defined for a particular page of memory, such that user programs need to have the correct access keys in order to read or write to a particular storage within a page.

However, after a TLB miss, and the XU does not provide the storage key for the absolute address, the key needs to be fetched from the upper level caches or memory in order to write a complete entry (absolute address and storage key) into the TLB. The requirement to always obtain a key on a TLB miss also drives the desire to have a mechanism that can make a key fetch request to L2 cache as early as possible.

SUMMARY

According to one embodiment, a multi-level hierarchical memory system comprises a processor for processing requests for accessing data. The processor performs a method comprising receiving a request for data in the multi-level hierarchical memory system, the request including a virtual address for accessing the data, and querying a translation buffer to obtain an absolute address corresponding to the virtual address. Responsive to the translation buffer not containing an absolute address corresponding to the virtual address, the processor further performs querying a translation unit to obtain the absolute address corresponding to the virtual address, performing a directory look-up upon obtaining the absolute address to determine whether a matching absolute address exists in a directory indicating that a line is available in a primary cache for accessing the requested data, and sending a fetch request for the requested data to a next level in the multi-level hierarchical memory system above the primary cache. Processing of the fetch request by the next level in the multi-level hierarchical memory system occurs in parallel with the directory lookup. The method performed by the processor further comprises receiving the requested data from the next level in the hierarchical memory system in the primary cache to make the requested data available to be written to the primary cache as needed, depending on the results of the directory lookup.

According to another embodiment, a method for accessing data in a multi-level hierarchical memory system comprises receiving a request for data in the multi-level hierarchical memory system, the request including a virtual address for accessing the data. The method further comprises querying a translation buffer to obtain an absolute address corresponding to the virtual address, and, responsive to the translation buffer not containing an absolute address corresponding to the virtual address, querying a translation unit to obtain the absolute address corresponding to the virtual address. The method further comprises performing a directory look-up upon obtaining the absolute address to determine whether a matching absolute address exists in the directory indicating that a line is available in a primary cache for accessing the requested data and sending a fetch request for the requested data to a next level in the multi-level hierarchical memory system above the primary cache. Processing of the fetch request by the next level in the multi-level hierarchical memory system occurs in parallel with the directory lookup. The method further comprise receiving the requested data from the next level in the multi-level hierarchical memory system in the primary cache to make the requested data available to be written to the primary cache as needed, depending on the results of the directory lookup.

According to another embodiment, a processor for accessing data in a multi-level hierarchical memory system comprises a load store unit receiving a request for data, the request including a virtual address for accessing the data and a translation buffer storing absolute addresses corresponding to virtual addresses. Upon receipt of the request for accessing data, the translation buffer is queried to obtain an absolute address corresponding to the virtual address included in the request. The processor further comprises a translation unit for translating virtual addresses to absolute addresses. Responsive to the translation buffer not containing an absolute address corresponding to the virtual address, the translation unit is queried to obtain the absolute address corresponding to the virtual address. The processor further comprises a primary cache storing data and a directory storing absolute addresses corresponding to lines in the primary cache. Upon obtaining, the absolute address, a directory look-up is performed to determine whether a matching absolute address exists in the directory indicating that a line is available in the primary cache for accessing the requested data. A fetch request is sent to a next level in the hierarchical memory system above the primary cache. The next level in the multi-level hierarchical memory system processes the fetch request in parallel with the directory lookup. The requested data is returned to the primary cache to make the requested data available to be written to the primary cache as needed, depending on the results of the directory lookup.

Other systems, methods, and/or processors according to embodiments will be or become apparent to one with skill in the art upon review of the following drawings and detailed description. It is intended that all such additional systems, methods, and/or processors be included within this description, be within the scope of the present invention, and be protected by the accompanying claims.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

In the following, a multi-level hierarchical memory system with a primary cache (L1) and a second level cache (L2) are described for ease of explanation. Optionally, as those skilled in the art would appreciate, the level one (L1) cache can communicate directly to main memory, or through more levels or cache hierarchies.

According to an exemplary embodiment, to reduce the latency between obtaining an absolute address for use in retrieving data from an L1 cache and obtaining a storage data (if needed) from an L2 cache in the event of a TLB miss, a request for data is always sent to the L2 cache, regardless of whether the data is needed or not, i.e., regardless of whether the data exists in the L1 cache. A key fetch request may also be sent together with the request for data, in a key protected system. In the meantime, a directory lookup may be performed to prevent writing the line into the L1 cache when the line already exists in the L1 cache to avoid a directory multi-hit. Thus, the directory lookup is performed in parallel with processing of the fetch request by the L2 cache. Also, it is important not to overwrite a line in the L1 cache that has exclusive ownership, since that line might have already been stored to, and the data stored to the line should not be overwritten with data obtained from the L2 cache. More specifically, when a processor has exclusive ownership to a cache line, it has the sole right to update the line and thus can have newly modified storage value in its cache, which can be different than those values in higher-level caches. Care must also be taken to make sure that the directory lookup result is completed before the L2 cache returns the fetch response, so that a determination can be made regarding what to do with the cache data returned by the L2 cache. If the data exists in the cache line in the L1 cache, the data returned from the L2 cache may simply be discarded. If the data does not exist in the cache line in the L1 cache, the data returned from the L2 cache may be written into the line in the L1 cache. As a result, by performing the directory lookup in parallel with processing of the request by the L2 cache, the latency caused by a TLB miss is shortened, and a simple request interface is provided between the L1 cache and the L2 cache.

Figure 1:
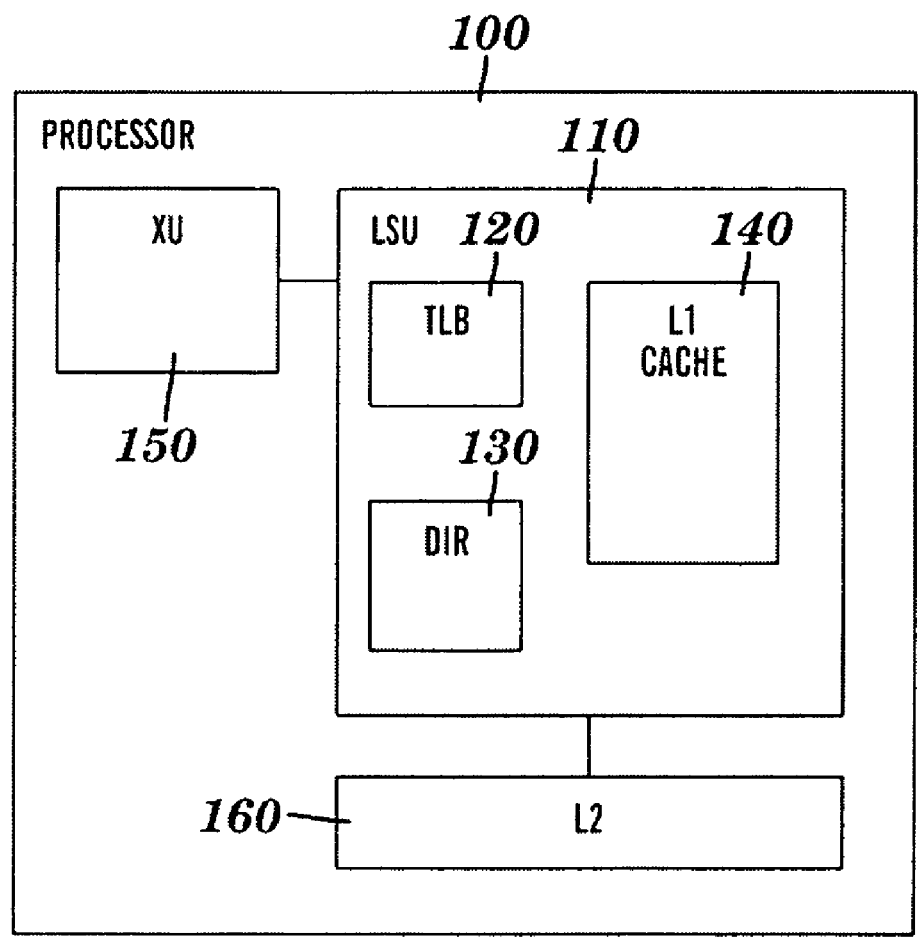
FIG. 1 illustrates an exemplary system for accessing data in a multi-level hierarchical memory system.

FIG. 1 illustrates an exemplary system for accessing data in a multi-level data cache. A processor 100 includes a Load Store Unit 110 for receiving and responding to cache requests (via, e.g., an hardware interface with a instruction dispatcher within the processor) and an XU 150 for translating requests containing virtual addresses into requests containing absolute addresses. When a cache request containing a virtual address comes into the LSU 110, a TLB lookup is performed in the TLB 120 to determine if an absolute address translation is stored there. If a TLB miss occurs, a translation request is sent to the XU 150. When the XU 150 determines the translation results will be ready in a few cycles, it sends the LSU 110 an "advanced done" warning signal. The LSU 110 uses this to set up a priority cycle for a DIR lookup in the directory 130. If the warning signal turns out to be false (i.e., a "done" signal doesn't arrive from the XU 150 within n cycles, where n is a predetermined number, after "advanced done"), the DIR lookup priority cycle is set up again when the warning signal is received again from the XU 150. If the "done" signal is received within n cycles, then the DIR lookup is performed using the absolute address, and, at the same time, a request for the storage key (if needed) and data are sent to the L2 cache 160.

Cycles may be counted to make sure the DIR lookup result will be ready in time for the earliest response from the L2 cache. If there is no absolute address in the DIR 130 matching the absolute address obtained from the XU, the data returned from the L2 cache may be written into a DIR Least Recently Used (LRU) set or an invalid/unused set. If there is a directory hit that is read-only, then the data returned from the L2 cache is written into the line of the L1 cache corresponding to the DIR hit set (overwriting the same hit set to avoid a DIR multi-hit). If the DIR hit is exclusive to the same line, then the L1 cache should not be overwritten to prevent writing over potential newly stored data that is in the LSU but not necessarily in the L2. This is true for a store-through or a store-in design, as those skilled in the art would appreciate. However, according to an exemplary embodiment, a feature is added to determine if the exclusive line has been invalidated from the L1 cache after the directory lookup, and before the returned data from the L2 cache is received. If the exclusive line has been invalidated, the DIR hit state is overwritten. Otherwise, a determination is made whether a DIR miss occurs later, and the data needs to be fetched from the L2 cache again. In a key protected system, the key is written to the TLB regardless of the DIR lookup result. This is explained in further detail below with reference to FIG. 2.

Figure 2:
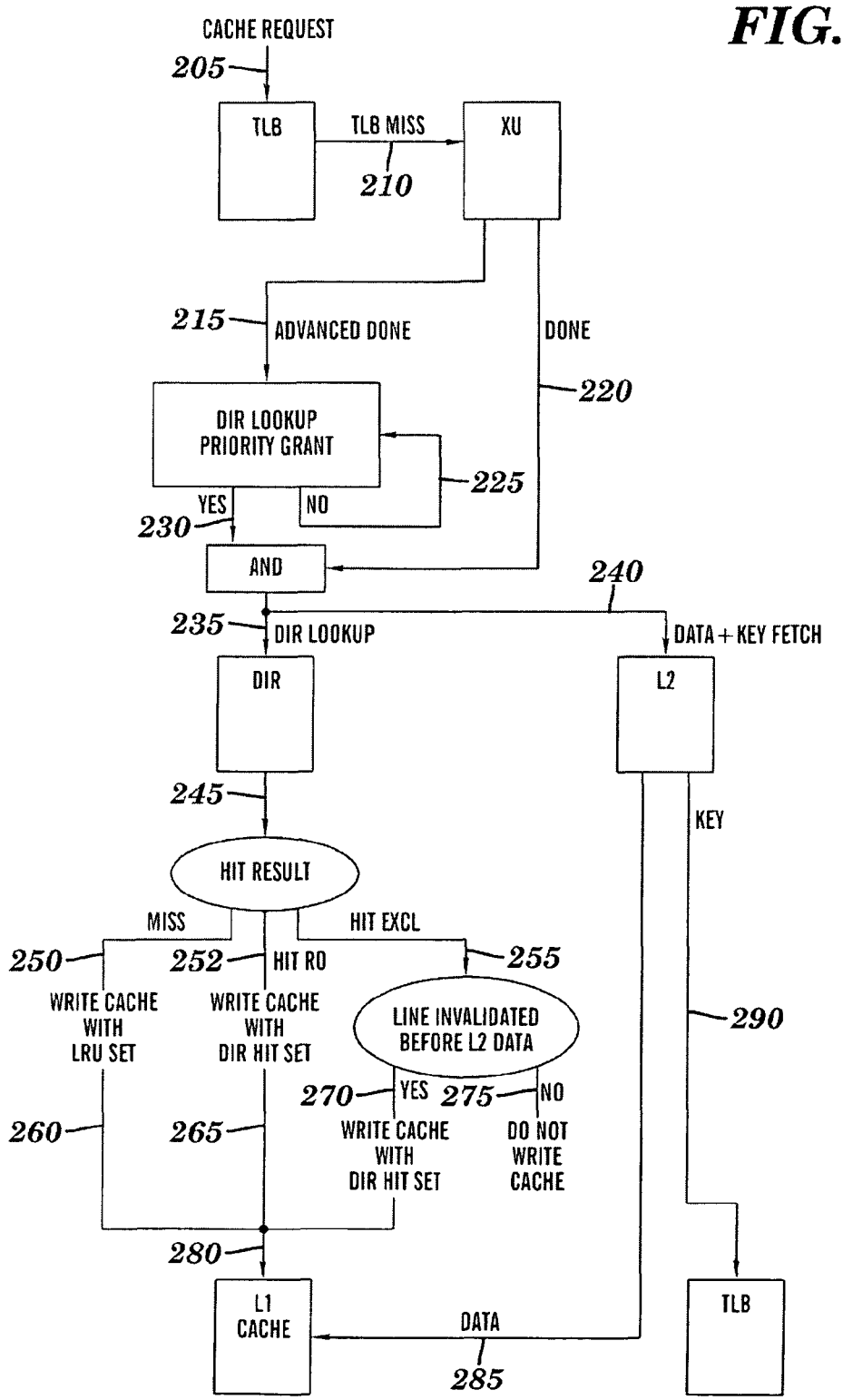
FIG. 2 depicts the flow of an exemplary process for accessing data in a multi-level hierarchical memory system.

FIG. 2 depicts the flow of an exemplary process for accessing data in a multi-level data cache. A cache request is received {205} by the processor 100, and the TLB 120 is queried for an absolute address. If a TLB miss occurs, a translation request is sent (210) to the XU 150 to obtain the absolute address that is needed for a directory lookup. When the XU 150 determines the result will be ready in a few cycles, the XU 150 sends the LSU 110 an "advanced done" warning signal (215). A priority cycle is set up for a DIR lookup. If the warning signal turns out to be false, i.e. a "done" signal isn't received from the XU 150 within n cycles after an "advanced done" signal, then the priority cycle is restarted (225) when the advanced warning signal is again received. If the "done" signal is received (220) from the XU 150, and the priority cycle is set up (230), then a DIR lookup is performed to obtain the absolute address (235). The absolute address is used for the directory lookup (235) and to send a fetch request for the requested data, and the storage key (240) in a key protected system, to the L2 cache. The directory lookup may be started at the same time that the fetch request is sent to the L2 cache. Further, the directory lookup may be performed in parallel with processing of the fetch request by the L2 cache.

Although not shown in FIG. 2, cycles may be counted to make sure the directory lookup result will be ready in time for the response from the L2 cache. A hit result may be generated based on the directory lookup, indicating whether there is a match between the absolute address obtained from the XU 150 and an absolute address in the DIR 130 corresponding to a line in the L1 cache having data available. If there is a directory miss (250), then data returned (285) from the L2 cache is written (260) to a line in the L1 cache corresponding to a DIR LRU set or an invalid/unused set. If there is a directory hit that is read-only (252), then the data returned (285) from the L2 cache is written (265) into the line of the L1 cache corresponding to the DIR hit set (overwriting the data in the cache to avoid a directory multi-hit). If the directory hit is exclusive (255), this indicates that the L1 cache should not be overwritten with the L2 data to prevent writing over potential newly stored data that is only in the LSU but not in the L2 cache. However, if the exclusive line is invalidated from the L1 cache after the directory lookup, and before the data from the L2 cache returns due, e.g., to a L2 LRU or L2 cross-invalidate, etc., then the line in the L1 cache corresponding to the DIR hit set is overwritten (270). Otherwise, a directory miss will be seen later, and that line would have to be fetched from the L2 cache again. If the exclusive line is not invalidated, then the line in the L1 cache is not overwritten (275) with the data from the L2 cache. In a key protected system, the key obtained from the L2 cache is written into the TLB (290), regardless of the directory lookup result.

According to another embodiment, instead of waiting for the priority cycle to forward the absolute address to send the fetch request to the L2 cache, logic may be added to look for a "bubble cycle" to conduct the absolute address forwarding earlier. The L2 request may be sent a predetermined number of cycles earlier, e.g., five cycles earlier. In this case, while the fetch request is sent to the L2 cache in advance of starting the directory lookup, the processing of the fetch request is still performed in parallel with the directory lookup. Although a bubble cycle may be found earlier than that, the L2 request should not be sent too early before the directory lookup priority is granted, since the directory lookup result is needed to determine what set to write the returned data to or if the data writing needs to be blocked, e.g., in case of a directory hit exclusive.

The flow diagram depicted herein is just an example. There may be many variations to these diagrams or the steps (or operations) described therein without departing from the spirit of the invention. For instance, the steps may be performed in a differing order, or steps may be added, deleted or modified. All of these variations are considered a part of the claimed invention.

In addition, although a L2 cache is described above for illustrative purposes, there can be zero or more cache levels in between the primary cache and main memory (not illustrated in FIG. 1 for simplicity of illustration), as those skilled in the art would appreciate. Further, although the L2 cache is shown in FIG. 1 as part of the processor 100, it should be appreciated that the L2 cache, as well as higher-level caches and the main memory, may be distinct from the processor and may be shared by multiple processors.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:
1. A multi-level hierarchical memory system comprising:
a processor configured to perform a method comprising:

receiving a request for data in a multi-level hierarchical memory system that includes at least one level of cache as a primary cache, the request including a virtual address for accessing the data;

querying a translation unit to obtain the absolute address corresponding to the virtual address, the translation unit configured to perform a multi-cycle translation process that generates a warning signal when the translation process is near completion, and that generates a done signal when the translation process is complete;

performing a directory lookup, the directory lookup including a priority cycle set-up phase that is initiated in response to the warning signal being generated, and an execution phase that is initiated in response to the done signal being generated and upon obtaining the absolute address to determine whether a matching absolute address exists in a directory indicating that a line is available in the primary cache for accessing the requested data;

sending a fetch request for the requested data to a next level in the multi-level hierarchical memory system above the primary cache, wherein at least a portion of processing of the fetch request by the next level in the multi-level hierarchical memory system occurs in parallel with the execution phase of the directory lookup; and receiving the requested data from the next level in the hierarchical memory system.

2. The multi-level hierarchical memory system of claim 1, wherein the fetch request includes a request for a storage key, and the requested storage key is transmitted from the next level in the multi-level hierarchical memory system to the translation buffer.

3. The multi-level hierarchical memory system of claim 1, wherein
at least one of the execution phase of the directory lookup is started at the same time that the fetch request is sent to the next level in the multi-level hierarchical memory system, and the fetch request is sent to the next level in the hierarchical memory system a predetermined number of cycles before the execution phase of the directory lookup starts.

4. The multi-level hierarchical memory system of claim 1, wherein the execution phase of the directory lookup includes generating a directory hit result indicating whether there is a match between the obtained absolute address and an absolute address in the directory, wherein the match indicates that a matching line is available in the primary cache for accessing the requested data.

5. The multi-level hierarchical memory system of claim 4, wherein, responsive to the directory hit result indicating that there is not a match, the processor writes the requested data returned from the next level in the multi-level hierarchical memory system to a line in the primary cache.

6. The multi-level hierarchical memory system of claim 5, wherein, the location to write a requested line in the primary cache is corresponding to a least recently used absolute address or an unused absolute address in the directory.

7. The multi-level hierarchical memory system of claim 4, wherein, responsive to the directory hit result indicating that there is a match that is read-only, the processor writes the requested data returned from the next level in the multi-level hierarchical memory system to the matching line in the primary cache.

8. The multi-level hierarchical memory system of claim 4, wherein, responsive to the directory hit result indicating that there is a match that is exclusive, the processor determines whether the matching line in the primary cache has been invalidated before the requested data from the next level in the multi-level hierarchical memory system is returned to a line in the primary cache.

9. The multi-level hierarchical memory system of claim 8, wherein, responsive to a determination that the matching line in the primary cache has been invalidated before the data from the next level in the multi-level hierarchical memory system is returned, the processor writes the requested data returned from the next level in the hierarchical memory system to the matching line in the primary cache.

10. A method for accessing data in a multi-level hierarchical memory system, comprising:
receiving a request for data in a multi-level memory hierarchical system that includes at least one level of cache as a primary cache, the request including a virtual address for accessing the data;

querying a translation unit to obtain the absolute address corresponding to the virtual address, the translation unit configured to perform a multi-cycle translation process that generates a warning signal when the translation process is near completion, and that generates a done signal when the translation process is complete;

performing a directory lookup, the directory lookup including a priority cycle set-up phase that is initiated in response to the warning signal being generated, and an execution phase that is initiated in response to the done signal being generated and upon obtaining the absolute address to determine whether a matching absolute address exists in the directory indicating that a line is available in a primary cache for accessing the requested data;

sending a fetch request for the requested data to a next level in the multi-level hierarchical memory system above the primary cache, wherein at least a portion of processing of the fetch request by the next level in the multi-level hierarchical memory system occurs in parallel with the execution phase of the directory lookup; and receiving the requested data from the next level in the multi-level hierarchical memory system.

11. The method of claim 10, wherein the fetch request includes a request for a storage key, and the storage key is transmitted from the next level in the multi-level hierarchical memory system to the translation buffer.

12. The method of claim 10, wherein
at least one of the execution phase of the directory lookup is started at the same time that the fetch request is sent to the next level in the multi-level hierarchical memory system, and the fetch request is sent to the next level in the multi-level hierarchical memory system a predetermined number of cycles before the execution phase of the directory lookup starts.

13. The method of claim 10, wherein the execution phase of the directory lookup includes generating a directory hit result indicating whether there is a match between the obtained absolute address and an absolute address in the directory indicating that a matching line is available in the primary cache for accessing the requested data.

14. The method of claim 13, further comprising, responsive to the directory hit result indicating that there is not a match, writing the requested data returned from the next level in the multi-level hierarchical memory system to a line in the primary cache corresponding to a least recently used absolute address or an unused absolute address in the directory.

15. The method of claim 13, further comprising, responsive to the directory hit result indicating that there is a match that is read-only, writing the requested data returned from the next level in the multi-level hierarchical memory system to the matching line in the primary cache.

16. The method of claim 13, further comprising, responsive to the directory hit result indicating that there is a match that is exclusive, determining whether the matching line in the primary cache has been invalidated before the requested data from the next level in the multi-level hierarchical memory system is returned to a line in the primary cache.

17. The method of claim 16, further comprising, responsive to a determination that the matching line in the primary cache has been invalidated before the data from the next level in the multi-level hierarchical memory system is returned, writing the requested data returned from the next level in the hierarchical memory system to the matching line in the primary cache.

18. A processor for accessing data in a multi-level hierarchical memory system, comprising:
   a load store unit configured for receiving a request for data, the request including a virtual address for accessing the data;
   a translation unit configured for translating the virtual addresses to an absolute addresses, the translating comprising a multi-cycle translation process that generates a warning signal when the translation process is near completion, and that generates a done signal when the translation process is complete;
   a primary cache configured for storing data;
   a directory configured for storing absolute addresses corresponding to lines in the primary cache and for performing a directory lookup, the directory lookup including a priority cycle set-up phase that is initiated in response to the warning signal being generated, and an execution phase that is initiated in response to the done signal being generated and upon obtaining the absolute address to determine whether a matching absolute address exists in the directory indicating that a line is available in the primary cache for accessing the requested data;
   circuitry configured for sending a fetch request for the requested data to a next level in a multi-level hierarchical memory system above the primary cache and for receiving the requested data from the next level in the hierarchical memory system, wherein at least a portion of processing of the fetch request by the next level in the multi-level hierarchical memory system occurs in parallel with the execution phase of the directory lookup.

19. The processor of claim 18, wherein the fetch request includes a request for a storage key, and the requested storage key is transmitted from the next level in the hierarchical memory system to the translation buffer.

20. The processor of claim 18, wherein the execution phase of the directory lookup generates a directory hit result indicating whether there is a match between the obtained absolute address and an absolute address in the directory indicating that a matching line is available in the primary cache for accessing the requested data, and the requested data returned from the next level in the multi-level hierarchical memory system is written to the matching line in the primary cache based on the directory hit result.

* * * * *